(12) United States Patent
Dobner et al.

(10) Patent No.: US 7,245,709 B2
(45) Date of Patent: Jul. 17, 2007

(54) PORTABILITY OF SUBSCRIBER FEATURES IN A TELECOMMUNICATION SYSTEM

(75) Inventors: Frank J. Dobner, North Aurora, IL (US); Cynthia Kae Florkey, Chicago, IL (US); Karla Rae Hunter, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 603 days.

(21) Appl. No.: 10/614,930

(22) Filed: Jul. 8, 2003

(65) Prior Publication Data
US 2005/0008136 A1    Jan. 13, 2005

(51) Int. Cl.
*H04M 15/00* (2006.01)
(52) U.S. Cl. .......................... 379/114; 379/121; 455/461
(58) Field of Classification Search ................. 379/114, 379/121; 455/461
See application file for complete search history.

(56) References Cited

U.S. PATENT DOCUMENTS

| | | | | | |
|---|---|---|---|---|---|
| 4,899,373 | A | * | 2/1990 | Lee et al. | 379/201.05 |
| 5,197,092 | A | * | 3/1993 | Bamburak | 379/211.05 |
| 5,206,899 | A | * | 4/1993 | Gupta et al. | 379/120 |
| 5,574,780 | A | * | 11/1996 | Andruska et al. | 379/221.09 |
| 5,854,836 | A | * | 12/1998 | Nimmagadda | 379/221.13 |
| 6,317,484 | B1 | * | 11/2001 | McAllister | 379/88.02 |
| 6,950,508 | B1 | * | 9/2005 | Griffiths | 379/201.01 |

* cited by examiner

*Primary Examiner*—Quynh H. Nguyen

(57) ABSTRACT

A telephone subscriber is provided with call features associated with his home telephone line when the subscriber is at a remote (different) telephone line. Aspects include: registration of the subscriber at a remote telephone line with association of the subscriber's normal call feature set with the remote line; processing of incoming calls for the subscriber so that the calls reach the subscriber at the remote line with the subscriber's call feature set being available to handle processing of the incoming call; processing of outgoing calls from the subscriber at the remote line so that the calls are processed with the subscriber's call feature set.

4 Claims, 3 Drawing Sheets

PORTABILITY OF SUBSCRIBER FEATURES IN A TELECOMMUNICATION SYSTEM

BACKGROUND

This invention is generally directed to services provided to subscribers in a telecommunication system, and is more specifically directed to the ability of subscribers to utilize services subscribed to on a home line or business line while physically communicating in a different location.

Modern telecommunication systems offer subscribers a variety of services. An example of such services includes, but is not limited to, selective ring tones, voice messaging, caller identification, call waiting, 3-way calling, privacy management, etc. Normally such subscribed to features are only available when the subscriber utilizes a subscriber line, e.g. the subscriber's home or business telephone line, to which such features are associated. Therefore it is appropriate to view such conventional services as being deployed for a specific telephone line, as opposed to being associated with a specific subscriber.

A mechanism for associating subscribed to services with the subscriber instead of a subscriber line is provided in U.S. Pat. No. 5,574,780 that is directed to "Control of Call Features Provided to a Subscriber by a Hierarchical Telecommunication Switch". A personal identification number (PIN) of the calling party (subscriber) is utilized by a hierarchical switch to locate an associated record that defines call features subscribed to by the calling party. This requires the calling party to enter his PIN each time communication services are sought.

It is annoying for subscribers who rely on optional call related services available from their normal subscriber line to be denied such services when temporarily utilizing a different subscriber line. Where the subscriber's normal subscriber line and the temporarily used line are both served by the same service provider, the same service provider has already been compensated for providing the services. Thus, there exists a need for a solution that will permit a subscriber temporarily using a different subscriber line to obtain the optional call related services normally available to the subscriber from their normal subscriber line.

SUMMARY OF THE INVENTION

It is an object of the present invention to provide such a solution.

In accordance with an embodiment of the present invention, a method provides a telephone subscriber with call features associated with his home telephone line when the subscriber is at a remote (different) telephone line. Embodiments of the invention include: registration of the subscriber at a remote telephone line with association of the subscriber's normal call feature set with the remote line; processing of incoming calls for the subscriber so that the calls reach the subscriber at the remote line with the subscriber's call feature set being available to handle processing of the incoming call; processing of outgoing calls from the subscriber at the remote line so that the calls are processed with the subscriber's call feature set.

DETAILED DESCRIPTION

Figure 1:
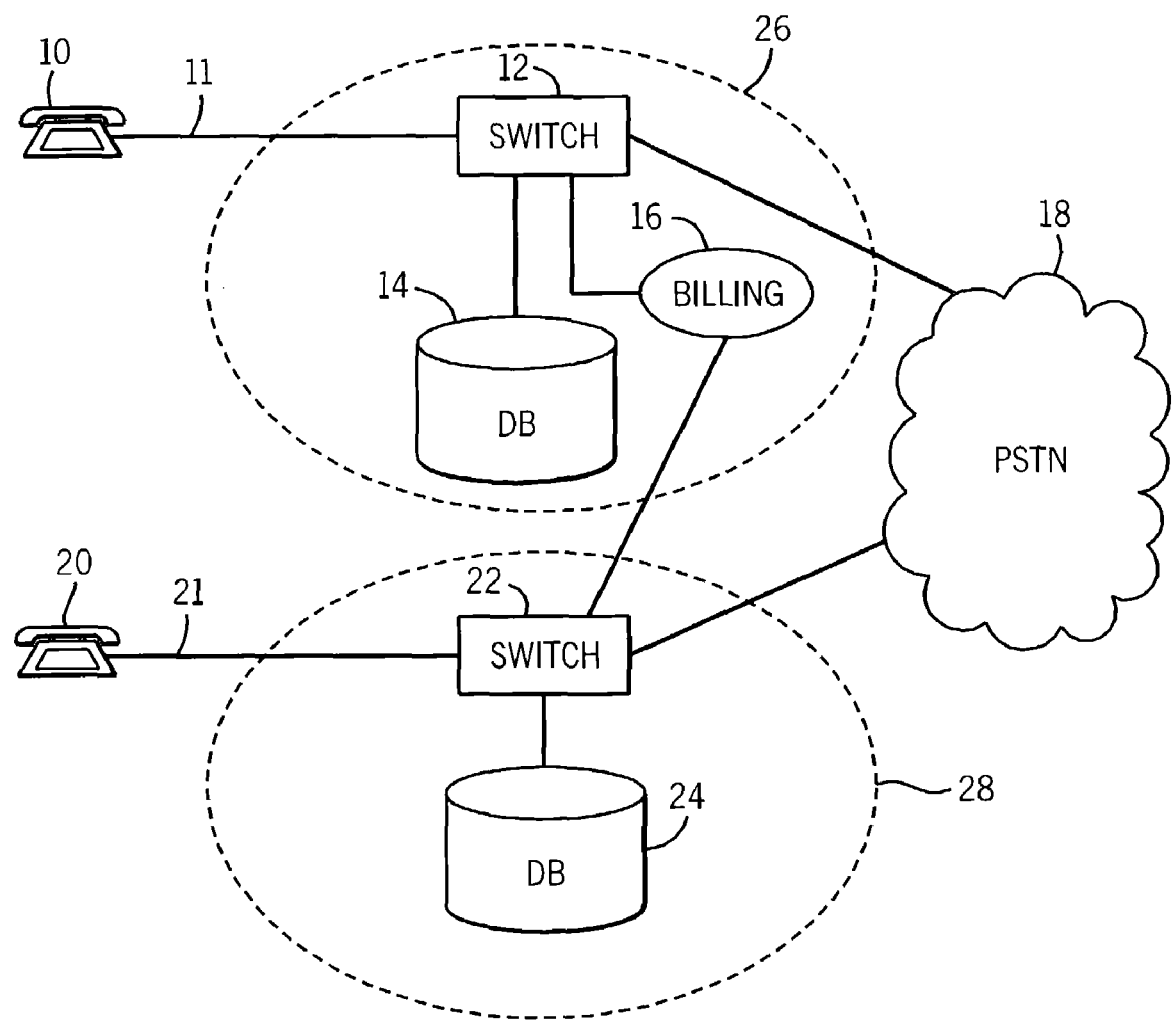
FIG. 1 is a block diagram of a telecommunication system suited for incorporating an embodiment of the present invention.

In FIG. 1 a telephony communication device 10, which may be a plain old telephone service (POTS) telephone set, an integrated services digital network (ISDN) telephone set, voice over IP soft client, IP PBX telephone, or any other voice endpoint, is connected to telecommunication switch 12, such as a 5ESS® Switch available from Lucent Technologies Inc. or call server such as the Lucent Softswitch, by subscriber line 11. The switch 12 is coupled to and supported by a database (DB) 14 and a billing peripheral node 16 that is responsible for maintaining and compiling subscriber billing information. The switch 12 is also coupled to the public switched telephone network (PSTN) 18. Telephony communication device 20 is coupled by subscriber line 21 to telecommunication switch 22 that is supported by database 24. The switch 22 is also coupled to the PSTN 18 and the billing peripheral node 16. A subscriber associated with a telephony communication device and the communication device itself will both be referred to using the same reference numeral; it will be apparent from the context whether the device or the subscriber is intended. Location 26 represents a geographic area in which subscribers, including subscriber 10, are served by switch 12. Likewise, location 28 represents a geographic area in which subscribers, including subscriber 20, are served by switch 22.

Before explaining the exemplary signal diagrams, it will be helpful to have an overview of the embodiment of the present invention. A subscriber 10 desires to obtain calling features associated with his normal subscriber (home) line 11 while at a remote subscriber line 21. The subscriber first registers with his local switch 12. The registration may be accomplished by the subscriber dialing a toll-free number from the remote subscriber line 21 where the toll-free number is dedicated to registering subscribes at remote subscriber lines. Alternatively the subscriber could enter a predetermined special services code to initial registration. After authenticating the identity of the subscriber, a profile of call services subscribed to by the subscriber is transferred from a home database 14 to a database 24 associated with the switch 22 serving the remote subscriber line 21. Also, the location of the subscriber, i.e. telephone number associated with the remote subscriber line 21, is stored in the database 14 associated with the switch 12 serving the home subscriber line 11. For incoming calls to the remotely located subscriber, the subscriber's home switch 12 retrieves the location of the subscriber and forwards the call to the remote switch 22 along with the telephone number associated with the remote subscriber line 21. The remote switch 22 retrieves the subscriber's profile from database 24 and proceeds to process the call in accordance with any inbound call handling features that may be active. If no special inbound call handling features are active, then the call is simply routed to the remote subscriber line 21 by causing it to ring. For outgoing calls from the remotely located subscriber, the subscriber's profile is retrieved by the remote switch 22 from database 24 and the outgoing call is processed in accordance with subscribed to services. The "home" subscriber line refers to the subscriber's line with which the subscriber's feature call set is normally associated, and is not limited to a line that serves a home or residence of the subscriber.

Figure 2:
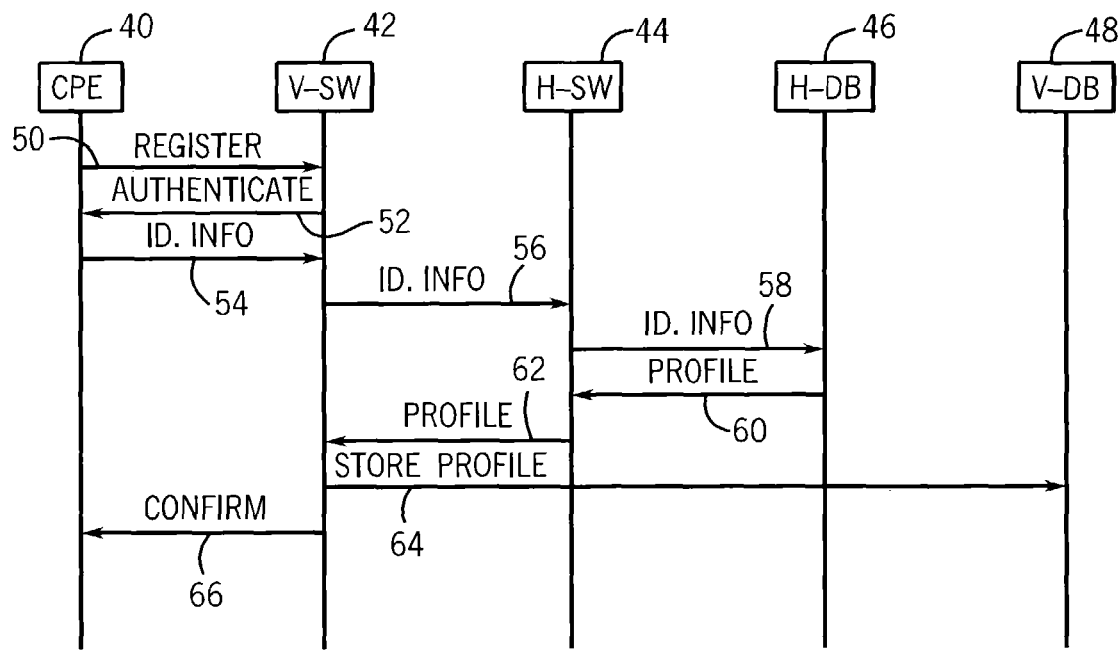
FIG. 2 is a signal diagram illustrating an embodiment of a registration process in accordance with the present invention.

FIG. 2 is a signaling diagram illustrating an exemplary registration process in accordance with the present invention. The vertical lines represent nodes or equipment between which signals flow, and include consumer premises equipment (CPE) 40, visiting switch (V-SW) 42, home switch (H-SW) 44, home database (H-DB) 46 and visiting database (V-DB) 48. In the illustrative example, subscriber 10 in area 26 utilizes a home subscriber line 11 that is supported by a home switch 12 and home database 14. The subscriber is temporarily visiting area 28 and desires to utilize his normal subscriber services when utilizing telephone set 20 that is connected by remote subscriber line 21 and supported by remote switch 22 and remote database 24. Therefore, in this example, the elements 40-48 in FIG. 2 correspond as follows to the elements in FIG. 1: 40=20; 42=22; 44=12; 46=14; 48=24.

The subscriber 10 utilizing telephone set 20 generates a registration signal 50 sent to the visiting switch 42 such as by entering a special feature code sequence, i.e. dialed digits, that is recognized by the visiting switch as a request for remote subscriber registration. The visiting switch 42 responds by sending CPE 40 a signal 52 requesting authentication of the subscriber such as by playing a voice prompt advising the subscriber to enter identification information including the telephone number upon which call services are to be based, e.g. the subscriber's home telephone number, and a PIN to authenticate the identity of the subscriber. This identification information is entered by the subscriber and transmitted as signal 54 to the visiting switch 42. Using the home telephone number entered by the subscriber to determine routing, the visiting switch 42 transmits the identification information as signal 56 to the home switch 44. The home switch 44 sends the identification information as a query signal 58 to the home database 46. The home database retrieves the profile record associated with the home telephone number and validates the PIN entered by the subscriber against a previously stored PIN in the record. Upon authenticating the subscriber based on a valid PIN, the home database 46 transmits the subscriber's profile as signal 60 to the home switch 44. The profile is a record that identifies telecommunication services subscribed to by the subscriber. The home switch 44 transmits the subscriber's profile as signal 62 to the visiting switch 42. In turn, the visiting switch 42 stores the received subscriber profile in the visiting database 48 by transferring it by signal 64. The visiting switch 42 sends a signal 66, such as a voice announcement, confirming the successful completion of the registration to CPE 40. This completes the registration process and facilitates the subscriber 10 being able to receive "at home" telecommunication services while at remote telephone set 20. This registration process is flexible in that it permits subscribers to directly access, in effectively real time, call feature set capabilities for use at other than their normal home telephone line.

Figure 3:
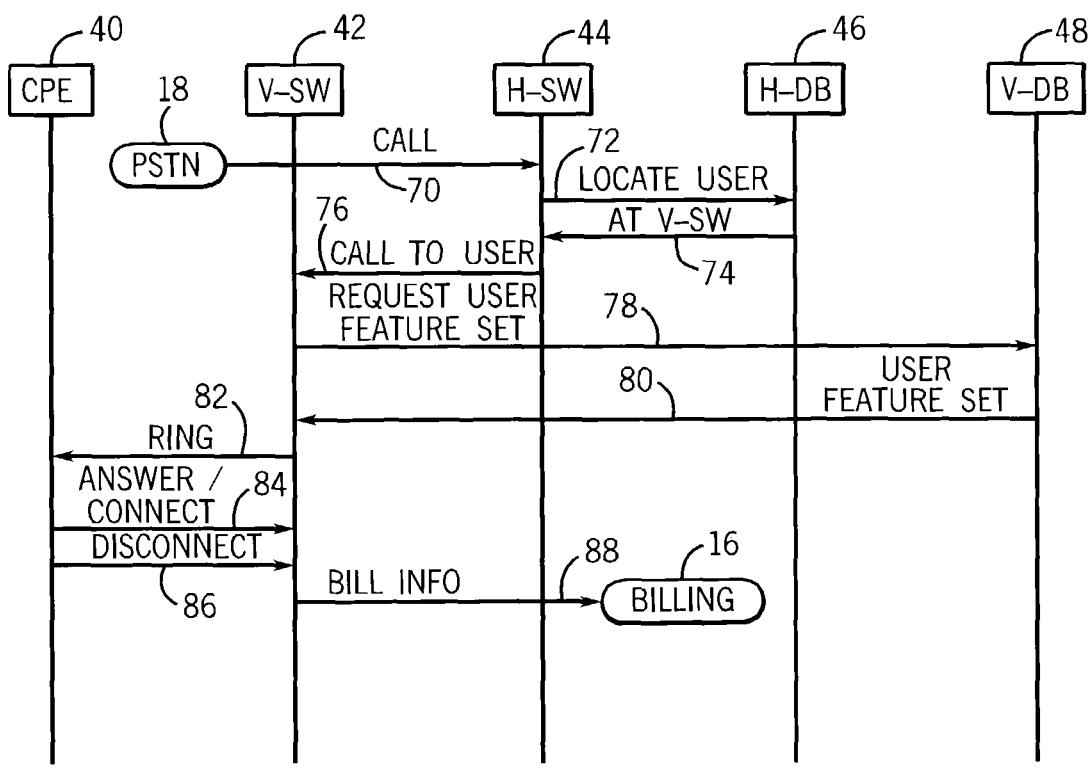
FIG. 3 is a signal diagram illustrating an embodiment of a call termination in accordance with the present invention.

FIG. 3 is a signal diagram of a call termination (incoming call) to a remotely located subscriber. In this example subscriber 10 is temporarily located at telephone set 20 and has successfully completed a remote subscriber registration in order to access the call features associated with the subscriber's home line 11. Elements 40–48 of FIG. 3 correspond to the same elements in FIG. 2, and to the same elements in FIG. 1 as explained with regard to FIG. 2. An incoming call from PSTN 18 to the home switch 44 is indicated by signal 70. The home switch 44 generates a locate user query 72 that is sent to the home database 46. The home database 46 transmits a reply signal 74 communicating that the subscriber is at the visiting switch 42. This information was previously stored in the home database 46 based on the earlier registration of the subscriber from the visiting switch. The home switch 44 transmits a signal 76 to the visiting switch 42 indicating an incoming call for the subscriber at the telephone number associated with line 21. Signal 76 also includes the home telephone number of the subscriber temporarily using telephone set 20. The visiting switch 42 generates an inquiry signal 78 transmitted to the visiting database 48. This inquiry signal requests that the subscriber's profile (user call feature set) be transmitted. A record stored during registration in the visiting database contains the profile which is located by the home telephone number of the subscriber. The visiting database 48 transmits a reply signal 80 to the visiting switch 42 transferring the user call feature set for use in processing the incoming call to the subscriber. The visiting switch 42 checks the user (subscriber) call feature set and determines whether special incoming call services are specified. The visiting switch 42 then proceeds to transmit a ring signal 82 to CPE 40 (telephone set 20). The subscriber 10 answers CPE 40 causing an answer/connect signal 84 to be transmitted to the visiting switch 42 whereby the calling party is connected with the subscriber 10 at remote telephone set 20. The subscriber 10 hangs up telephone set 20 resulting in a disconnect signal 86 being transmitted to the visiting switch 42. As part of the normal tear down sequence of the call, visiting switch 42 generates billing information that is transmitted by signal 88 to the billing node 16. This completes an example of an incoming call sequence to a remotely located subscriber. It will be apparent to those skilled in the art that incoming call services, such as privacy management, could have caused the visiting switch to take different actions with regard to the handling of the incoming telephone call. Since the visiting switch has access to the call features subscribed to by the subscriber via the user's call feature set, the incoming call is handled by the visiting switch in a similar manner as if the subscriber had been at his home subscriber line with the call be handled by the home switch.

Figure 4:
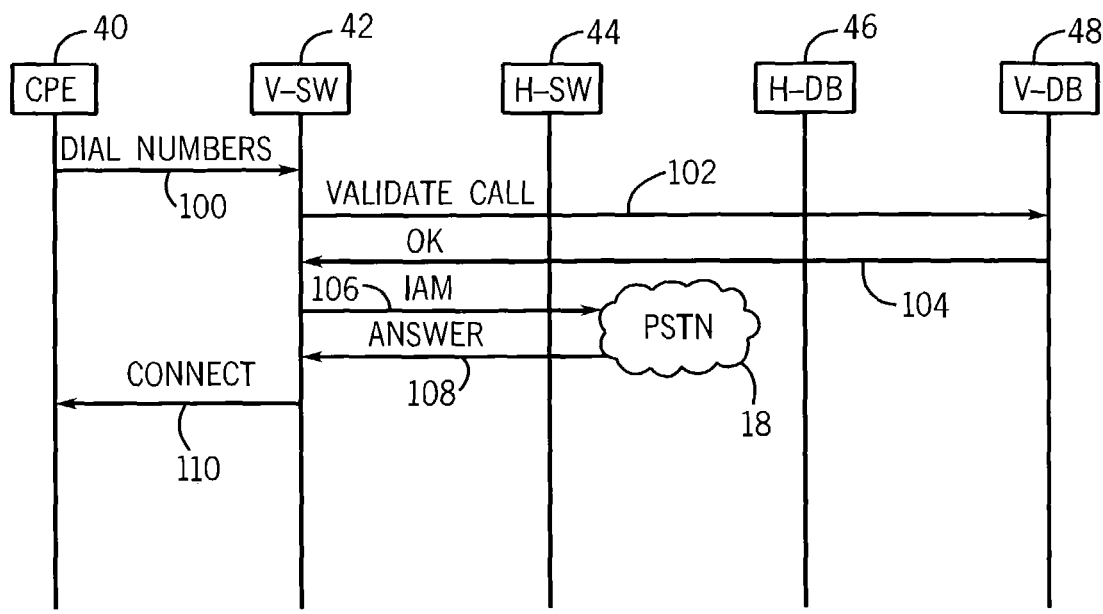
FIG. 4 is a signal diagram illustrating an embodiment of a call origination in accordance with the present invention.

FIG. 4 shows a signal diagram of a call origination by the remote subscriber. In this example subscriber 10 is temporarily located at telephone set 20 and has successfully completed the remote subscriber registration in order to access the call features associated with the subscriber's home line. The subscriber 10 utilizes telephone set 20 to initiate a new call by dialing the called party's number as indicated by signal 100. The visiting switch 42 receives the call request from CPE 40 (telephone set 20) and transmits a validate call query signal 102 transmitted to the visiting database 48. The visiting database 48 transmits a reply signal 104 to the visiting switch 42. In the illustrative embodiment, signal 104 constitutes an "OK" validation indicating that the call requested by subscriber 10 from CPE 40 is permitted. Alternatively, the visiting database 48 could return the user call feature set to the visiting switch 42 in order to permit the visiting switch to determine if any call origination features, e.g. speeds calling, etc., should be utilized. The visiting switch 42 initiates a call set up request by generating an initial address message (IAM) signal 106 that is transmitted to the PSTN 18. Assuming that a call completion is possible and that the called party answers, the PSTN 18 will generate an answer signal 108 returned to the visiting switch 42. The visiting switch 42 then provides a bearer channel connection to the calling subscriber as indicated by signal 110. This completes an example of a call origination sequence from a remotely located subscriber in which the subscriber's normal call feature set available from his home telephone is applied to the remote call origination.

Figure 5:
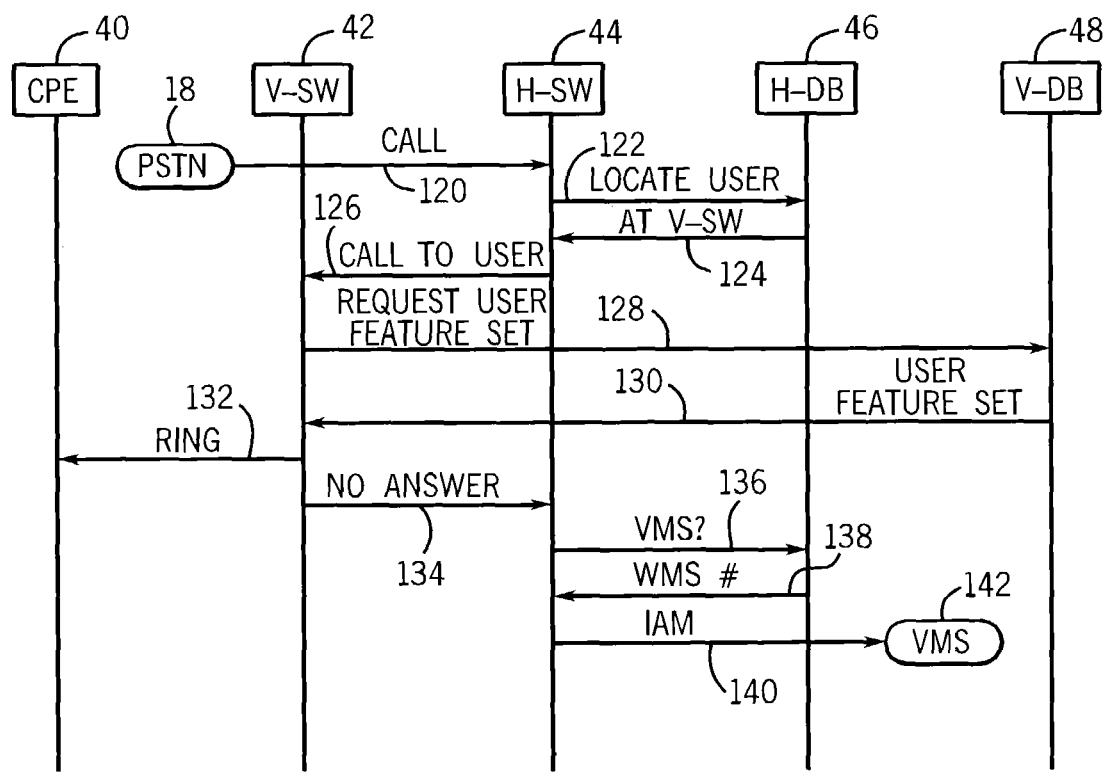
FIG. 5 is a signal diagram illustrating an embodiment of an incoming call to the subscriber that is redirected to a voice messaging system in accordance with the present invention.

FIG. 5 shows a signal diagram of an incoming call to remotely registered subscriber 10 temporarily located at CPE 40 (telephone set 20) in which subscriber 10 is not available to answer the redirected incoming call at telephone set 20 resulting in the incoming call being forwarded to a voice messaging system (VMS). In this example subscriber 10 has successfully completed the remote subscriber registration in order to access call features from telephone set 20 normally associated with the subscriber's telephone line 11. Elements 40–48 of FIG. 5 correspond to the same elements in FIG. 2, and to the same elements in FIG. 1 as explained with regard to FIG. 2.

An incoming call 120 is received from PSTN 18 at home switch 44. A locate user query 122 is generated by the home switch 44 and sent to the home database 46. The home database 46 sends a reply signal 124 to the home switch 44 where the reply signal contains the telephone number of telephone set 20 indicating that the user is to be reached at the visiting switch 42. The location of the subscriber 10 is stored in a record in the home database 46 during the registration process. The home switch 44 sends signal 126 to the visiting switch 42 indicating an incoming call for subscriber 10 at telephone set 20. The visiting switch 42 transmits a request 128 for the user call feature set to the visiting database 48. The visiting database 48 locates the record corresponding to the telephone number of telephone set 20 and returns the user call feature set information by signal 130 to the visiting switch 42. This information was stored as a record during the registration process. The visiting switch 42 sends a ringing signal 132 to CPE 40, i.e. telephone set 20. In this scenario subscriber 10 is not available to answer the incoming call at telephone set 20. After waiting a predetermined interval of time (or a predetermined number of rings), visiting switch 42 determines a "no answer" condition and transmits a no answer signal 134 to the home switch 44. Home switch 44 generates a query signal 136 transmitted to the home database 46 where the query signal seeks to determine whether the subscriber 10 subscribes to a voice messaging service based on information contained in the user call feature set. The home database 46 returns a reply signal 138 to the home switch 44 indicating that the subscriber 10 describes to a voice messaging service and provides the telephone number of the voice messaging service. The home switch 44 generates a call set up message IAM 140 that is transmitted to the voice messaging service (VMS) 142. The VMS 142 (not shown in FIG. 1) can be coupled to the home switch 12 in area 26 or could be located remote from the home switch and accessed through the PSTN 18. Instead of the subscriber being not available (or not desiring) to answer the incoming call, the subscriber could already be engaged in a call so that the subscriber's line would be busy, and could result in a transfer of the new incoming call to the VMS just as in the case of a "no answer". This completes an example of an incoming call to a remotely located subscriber and illustrates that substantially the same call handling features available to the subscriber by the subscriber's home switch can be accommodated even while the subscriber is temporarily remotely located at a different telephone set.

With regard to FIG. 5, an alternative implementation could be utilized. Instead of the visiting switch 42 transferring a no answer signal 134 to the home switch 44, the visiting switch 42 could directly implement an inquiry of the visiting database 48 as to whether the subscriber 10 subscribes to a voice messaging service. This information would be available at the visiting database 48 in the user call feature set data. The visiting switch 42 upon receiving the VMS telephone number from the visiting database 48 could then proceed to generate a call set up message IAM transmitted to the VMS 142.

Various changes and modifications to the above embodiments could be made while remaining within the scope of the present invention. The following examples of changes are not meant to include all such possible changes, but merely provide a sampling of the changes that are possible. Telephone line 21 could also be supported by the same switch 12 that supports the home telephone line 11 normally associated with the subscriber's subscribed to call features. In this situation, the actions carried out by a separate visiting switch are performed by the home switch. Even though the same switch supports the subscriber's home and remote lines, the home call feature set of subscribed to services would not have been made available to the subscriber at the remote telephone as per the prior art. Although separate databases 14 and 24 are shown associated with switches 12 and 22, respectively, the databases need not necessarily be located in the same geographic area as the respective switch. Further, a single centralized database could be employed to serve a plurality of switches and provide storage of subscriber registration for remote services. Various types of telephony devices and protocols, e.g. IP phones, could also benefit from an implementation the present invention and PSTN 18 could comprise a public telecommunication network including interworking with packet networks.

Although embodiments of the present invention have been shown and described, the scope of the present invention is defined by the claims that follow.

We claim:

1. A method for providing a telephone subscriber with call features associated with a home telephone line with a first telephone number of the subscriber when the subscriber is at a remote telephone line with a second telephone number, the method comprising the steps of:

registering the subscriber as present at the remote telephone line in a first database accessible by a home switch that supports the home telephone line;

transferring a user call feature set that defines call features made available by the home switch to the subscriber from the home switch to a visiting switch that supports the remote telephone line;

storing the user call feature set by the visiting switch in a second database separate from the visiting switch;

receiving at the home switch an incoming call for the subscriber directed to the first telephone number;

in response to the incoming call, retrieving the second telephone number from the first database by the home switch and redirecting the incoming call by the home switch to the visiting switch that supports the second telephone number;

receiving the redirected incoming call at the visiting switch;

retrieving, by the visiting switch from a second record in the second database, the user call feature set each time an incoming call is received; handling the incoming call by the visiting switch in accordance with the call features as determined by the retrieved user call feature set.

2. The method according to claim 1 wherein the step of registering comprises receiving a request from the remote telephone line to establish the presence of the subscriber at the remote telephone line, retrieving from the first database the subscriber's call feature set, storing the retrieved subscriber's call feature set in the second record in the second database where the second record includes the first and second telephone numbers.

3. The method according to claim 2 wherein the step of registering further comprises storing the second telephone number in the first record in the first database.

4. The method according to claim 3 wherein the second telephone number is obtained from calling line information data associated with a call placed from the remote telephone line as part of the request.

* * * * *